(12) United States Patent
Nunziata et al.

(10) Patent No.: US 11,005,534 B2
(45) Date of Patent: May 11, 2021

(54) NFC DEVICE AND METHOD OF OPERATING THE SAME

(71) Applicant: NXP B.V., Eindhoven (NL)

(72) Inventors: Fred George Nunziata, Graz (AT); Martin Buchsbaum, Graz (AT); Erich Merlin, Gratkorn (AT); Adrian Rafael Krenn, St. Bartholomä (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/988,852

(22) Filed: Aug. 10, 2020

(65) Prior Publication Data

US 2021/0075470 A1  Mar. 11, 2021

(30) Foreign Application Priority Data

Sep. 9, 2019  (EP) ..................................... 19196097

(51) Int. Cl.
*H04B 5/00*   (2006.01)
(52) U.S. Cl.
CPC .................................. *H04B 5/0056* (2013.01)
(58) Field of Classification Search
CPC ....... H04B 5/0056; H04B 5/00; H04B 5/0025
See application file for complete search history.

(56) References Cited

U.S. PATENT DOCUMENTS

| 10,237,000 | B1 * | 3/2019 | Buchsbaum | H04B 17/12 |
| 2010/0210207 | A1 * | 8/2010 | Goto | H04B 5/02 455/41.1 |
| 2012/0202429 | A1 * | 8/2012 | Wadsworth | H04L 27/22 455/42 |
| 2015/0295622 | A1 * | 10/2015 | Kim | H04B 1/1018 455/41.1 |
| 2016/0261314 | A1 * | 9/2016 | Cox | H04B 17/21 |
| 2019/0067818 | A1 * | 2/2019 | Cordier | H01Q 1/2225 |
| 2019/0074914 | A1 * | 3/2019 | Hueber | H04B 5/0075 |

\* cited by examiner

*Primary Examiner* — Md K Talukder

(57) ABSTRACT

In accordance with a first aspect of the present disclosure, a near field communication (NFC) device is provided, comprising: a modulator configured to modulate a carrier signal received from an external reader, resulting in a modulated carrier signal; a controller configured to control a transmission of the modulated carrier signal to the external reader; a transmitter driver configured to transmit said modulated carrier signal, said transmitter driver having a variable resistance; wherein the controller is further configured to change said variable resistance during a modulation phase of the NFC device such that a clock synchronization window is widened. In accordance with a second aspect of the present disclosure, a corresponding method of operating an NFC device is conceived. In accordance with a third aspect of the present disclosure, a non-transitory machine-readable medium is provided, comprising instructions which, when executed, carry out a method of the kind set forth.

16 Claims, 13 Drawing Sheets

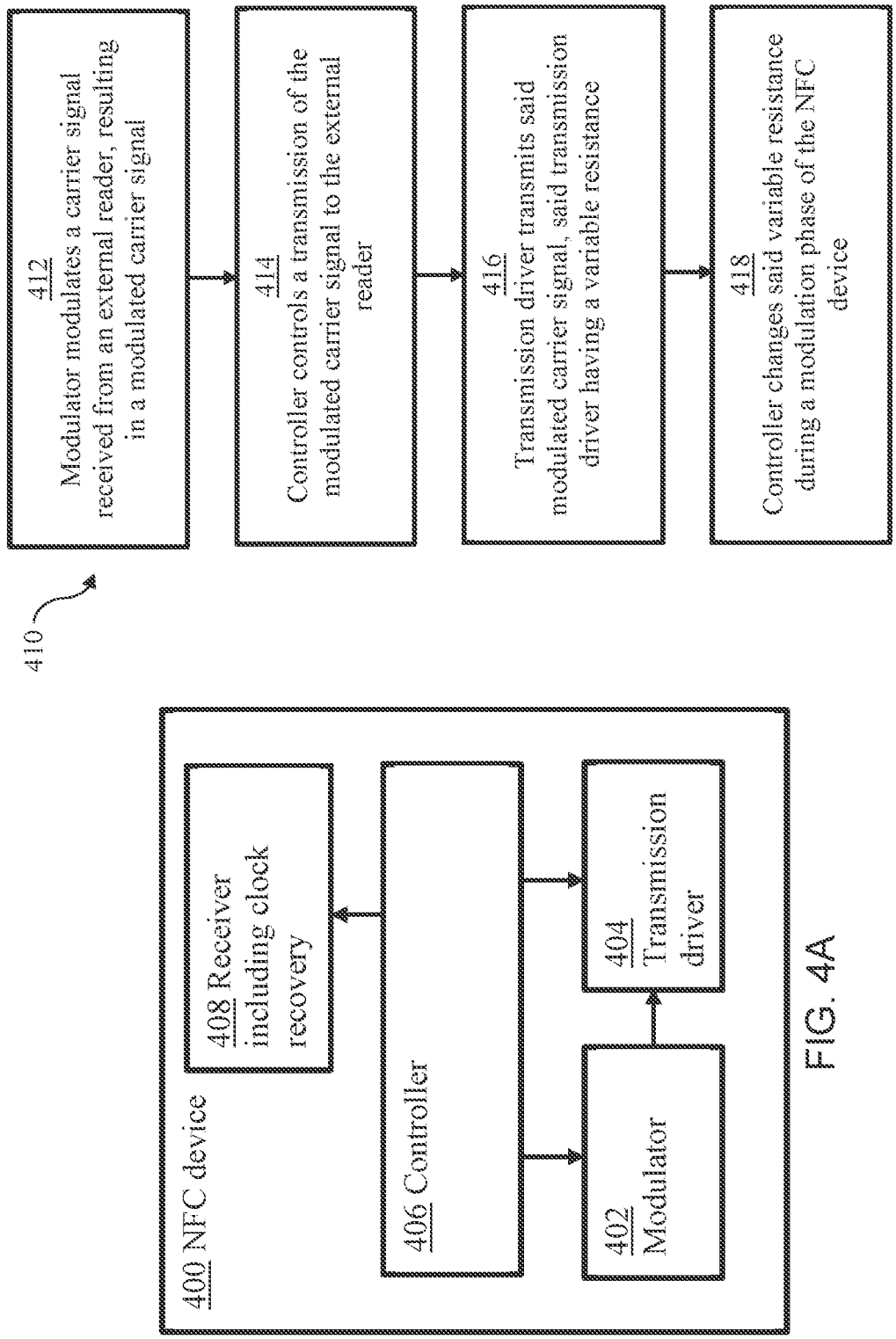

NFC DEVICE AND METHOD OF OPERATING THE SAME

CROSS-REFERENCE TO RELATED APPLICATIONS

This application claims priority under 35 U.S.C. § 119 to European Patent Application No. 19196097.0, filed on Sep. 9, 2019, the contents of which are incorporated by reference herein.

TECHNICAL FIELD

The present disclosure relates to a near field communication device. Furthermore, the present disclosure relates to a corresponding method of operating a near field communication device.

BACKGROUND

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions. Near field communication is often realized by means of modulation techniques. In that case, a near field device modulates a carrier signal received from a reader and transmits the modulated carrier signal back to the reader.

SUMMARY

In accordance with a first aspect of the present disclosure, a near field communication (NFC) device is provided, comprising: a modulator configured to modulate a carrier signal received from an external reader, resulting in a modulated carrier signal; a controller configured to control a transmission of the modulated carrier signal to the external reader; a transmitter driver configured to transmit said modulated carrier signal, said transmitter driver having a variable resistance; wherein the controller is further configured to change said variable resistance during a modulation phase of the NFC device such that a clock synchronization window is widened.

In one or more embodiments, the controller is configured to change said variable resistance by selecting a resistance from a plurality of different resistances.

In one or more embodiments, the controller is configured to select different resistances for consecutive transmission pulses during the modulation phase.

In one or more embodiments, the controller is further configured to select different resistances during the non-modulation phase.

In one or more embodiments, the controller is further configured to remove one or more transmission pulses at a beginning of one or more modulation phases of the NFC device.

In one or more embodiments, the NFC device further comprises a receiver for receiving the carrier signal, wherein the controller is further configured to control a reception of the carrier signal and to change, during the modulation phase of the NFC device, a variable resistance of an HF attenuator comprised in said receiver.

In one or more embodiments, the controller is configured to change said variable resistance of the HF attenuator by selecting a resistance from a plurality of different resistances.

In one or more embodiments, the controller is configured to select different resistances for consecutive transmission pulses during the modulation phase.

In one or more embodiments, the controller is further configured to select different resistances during the non-modulation phase.

In one or more embodiments, a mobile device comprises an NFC device of the kind set forth.

In accordance with a second aspect of the present disclosure, a method of operating a near field communication (NFC) device is conceived, the method comprising the following steps: a modulator modulates a carrier signal received from an external reader, resulting in a modulated carrier signal; a controller controls a transmission of the modulated carrier signal to the external reader; a transmitter driver transmits said modulated carrier signal, said transmitter driver having a variable resistance; wherein the controller changes said variable resistance during a modulation phase of the NFC device such that a clock synchronization window is widened.

In one or more embodiments, the controller changes said variable resistance by selecting a resistance from a plurality of different resistances.

In one or more embodiments, the controller selects different resistances for consecutive transmission pulses during the modulation phase.

In one or more embodiments, the controller further controls a reception of the carrier signal by a receiver and changes, during the modulation phase of the NFC device, a variable resistance of an HF attenuator comprised in said receiver.

In accordance with a third aspect of the present disclosure, a non-transitory machine-readable medium is provided, comprising instructions which, when executed, carry out a method of the kind set forth.

DESCRIPTION OF DRAWINGS

Embodiments will be described in more detail with reference to the appended drawings, in which:

FIG. 4A shows an illustrative embodiment of an NFC device;

FIG. 4B shows an illustrative embodiment of a method of operating an NFC device;

DESCRIPTION OF EMBODIMENTS

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions. Near field communication is often realized by means of modulation techniques. In that case, a near field device modulates a carrier signal received from a reader and transmits the modulated carrier signal back to the reader.

Figure 1:
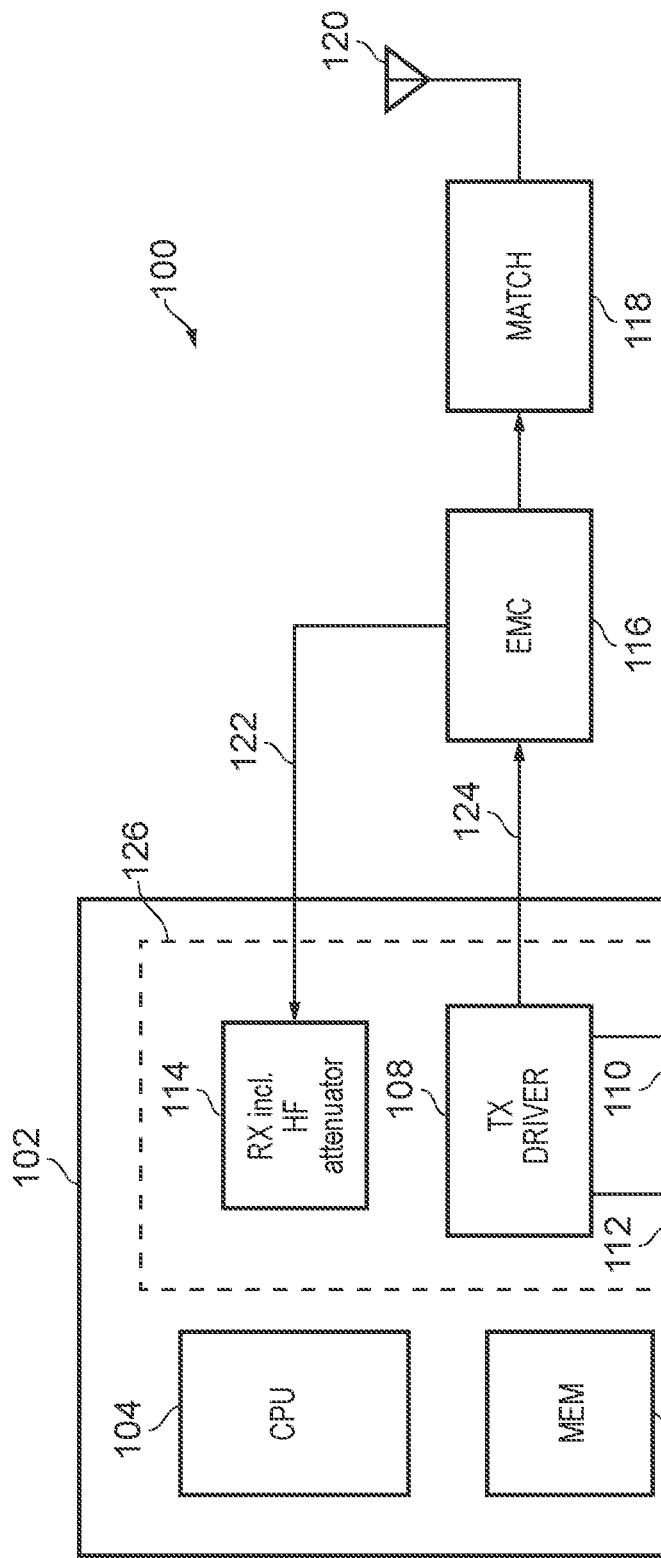
FIG. 1 shows an example of an NFC device.

FIG. 1 shows an example of an NFC device 100, as described in U.S. Pat. No. 10,237,000 B1. The NFC device 100 includes an NFC controller 102, electromagnetic compatibility (EMC) network 116, matching network 118, and antenna 120. The NFC controller 102 may be formed on an integrated circuit (IC) separate from EMC network 116, matching network 118, and antenna 120. For example, NFC device 100 may have EMC network 116, matching network 118, and antenna 120 formed on a printed circuit board (PCB) while NFC controller 102 may be mounted on the PCB as a separately packaged IC. NFC controller 102 includes central processing unit (CPU) 104, memory 106, and radio frequency (RF) transceiver 126. NFC controller 102 may include other functional blocks and circuits.

Processor 104 may be any type of processor, including circuits for processing, computing, etc., such as a microprocessor (MPU), microcontroller (MCU), digital signal processor (DSP), finite state machine (FSM), and the like. Processor 104 may be configured to execute instructions in order to carry out designated tasks. Memory 106 may include any suitable type of memory array, such as a non-volatile memory (NVM), static random-access memory (SRAM), or others. Memory 106 may be coupled to processor 104 by way of a system bus (not shown). Memory 106 may also be coupled directly or tightly to processor 104. NFC controller 102 may include multiple memories like memory 106 or a combination of different memory types. For example, memory 106 may include a flash memory array in addition to a separate SRAM array.

RF transceiver 126 includes transmitter (TX) driver circuit 108, clock generation circuit 110, phase adjustment circuit 112, and a receiver (RX) circuit 114 that includes a high frequency (HF) attenuator, among other circuits (not shown). An output signal line 124 couples the TX driver circuit 108 with the EMC network 116. The EMC network 116 is coupled with the RX circuit by way of a receive signal line 122. Matching network 118 is coupled between the EMC network 116 and antenna 120. In operation, a transmit signal is output from the TX driver circuit 108 based on the phase and clock frequency provided by way of the clock generation circuit 110 and phase adjustment circuit 112. The transmit signal is propagated through the EMC network 116 and matching network 118 and transmitted at antenna 120. The TX driver circuit 108 is typically a push/pull driver stage with the possibility to program the output $R_{ON}$ resistance. In operation, the RX circuit 114 serves to maintain a constant signal level by way of adjusting impedance.

Figure 2:
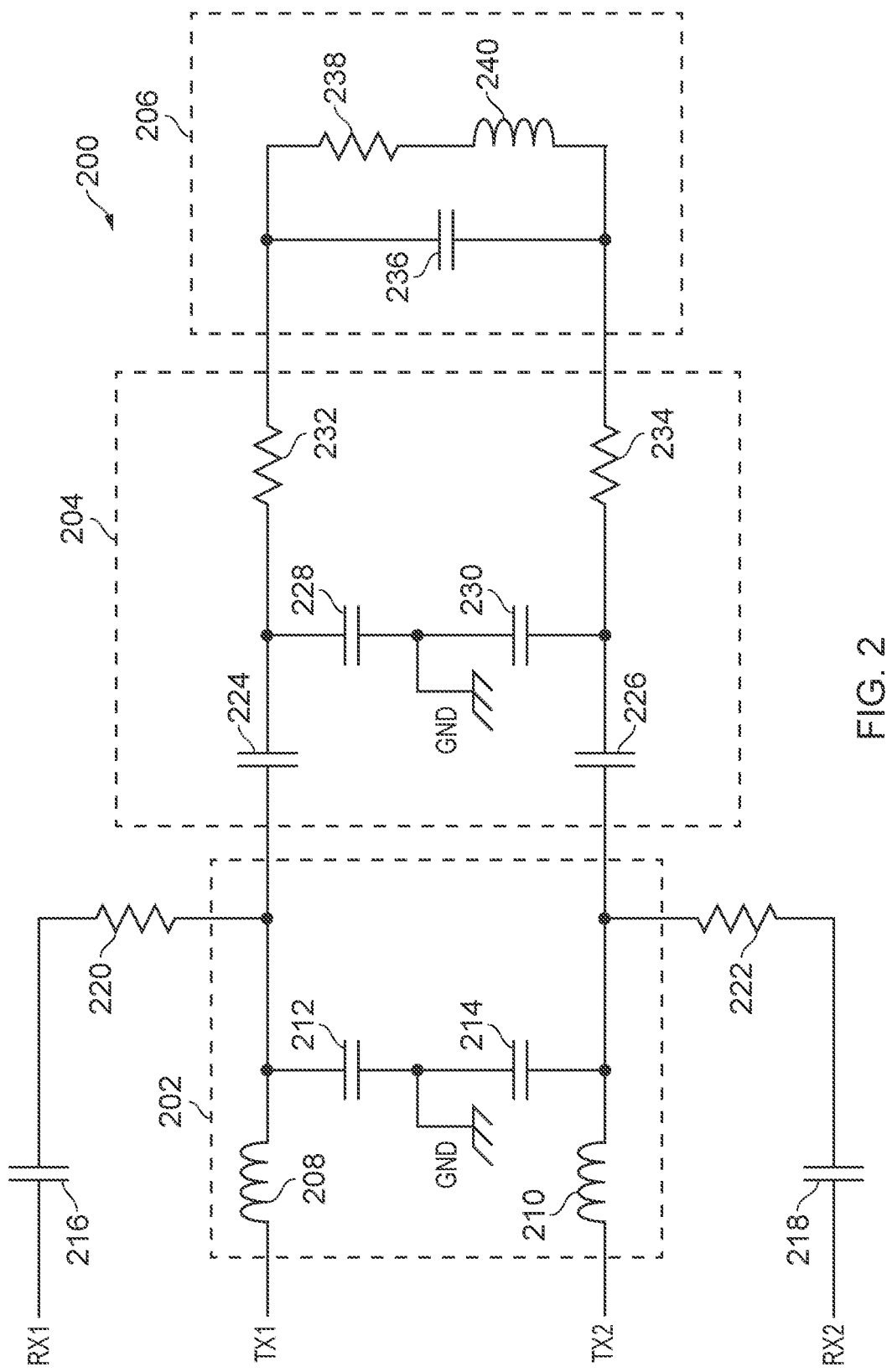
FIG. 2 shows an example of a transceiver simulation model.

FIG. 2 shows an example of a transceiver simulation model 200, as described in U.S. Pat. No. 10,237,000 B. In particular, an example simulation model 200 is shown, which includes an example EMC network model 202, an example matching network model 204, and example antenna model 206. Simulation model 200 depicts a differential transmit signaling path having terminals labeled TX1 and TX2. Likewise, differential receive signaling path is depicted having terminals RX1 and RX2. Single-ended signaling paths may be employed for transmit and/or receive signals. Here, the EMC network model 202 corresponds to the EMC network 116 of FIG. 1 where terminals TX1 and TX2 are coupled to the TX driver circuit 108 and terminals RX1 and RX2 are coupled to the RX circuit 114. Accordingly, matching network model 204 corresponds to matching network 118 and antenna model 206 corresponds to antenna 120.

The EMC network model 202 includes inductors 208, 210 and capacitors 212, 214. A first terminal of inductor 208 is coupled at input terminal TX1 and a second terminal of inductor 208 is coupled to a first terminal of capacitor 212 at a first node. A second terminal of capacitor 212 is coupled to ground voltage supply terminal labeled GND. A first terminal of inductor 210 is coupled at input terminal TX2 and a second terminal of inductor 210 is coupled to a first terminal of capacitor 214 at a second node. A second terminal of capacitor 214 is coupled to the GND supply terminal. The EMC network model 202 may include other components. Furthermore, the EMC network model 202 may be formed in a single-ended configuration.

Receive signaling path includes capacitors 216, 218 and resistors 220, 222. A first terminal of capacitor 216 is coupled at terminal RX1 and a second terminal of capacitor 216 is coupled to a first terminal of resistor 220. A second terminal of resistor 220 is coupled at the first node. A first terminal of capacitor 218 is coupled at terminal RX2 and a second terminal of capacitor 218 is coupled to a first terminal of resistor 222. A second terminal of resistor 222 is coupled at the second node. The receive signaling path may be formed in a single-ended configuration (e.g., capacitor 216, resistor 220 path).

The matching network model 204 includes capacitors 224-230 and resistors 232, 234. A first terminal of capacitor 224 is coupled to the EMC network model 202 at the first node and a second terminal of capacitor 224 is coupled to a first terminal of capacitor 228 at a third node. A second terminal of capacitor 228 is coupled to GND supply terminal. A first terminal of capacitor 226 is coupled to the EMC network model 202 at the second node and a second terminal of capacitor 226 is coupled to a first terminal of capacitor 230 at a fourth node. A second terminal of capacitor 230 is coupled to the GND supply terminal. A first terminal of resistor 232 is coupled at the third node and a second terminal of resistor 232 is coupled to the antenna model at a fifth node. A first terminal of resistor 234 is coupled at the fourth node and a second terminal of resistor 234 is coupled to the antenna model at a sixth node. The matching network model 204 may include other components as well.

The antenna model 206 includes capacitor 236, resistor 238, and inductor 240. A first terminal of capacitor 236 is coupled at the fifth node and a second terminal of capacitor 236 is coupled at the sixth node. A first terminal of resistor 238 is coupled at the fifth node and a second terminal of resistor 238 is coupled to a first terminal of inductor 240. A second terminal of inductor 240 is coupled at the sixth node. The antenna model 206 may include other components as well.

Figure 3:
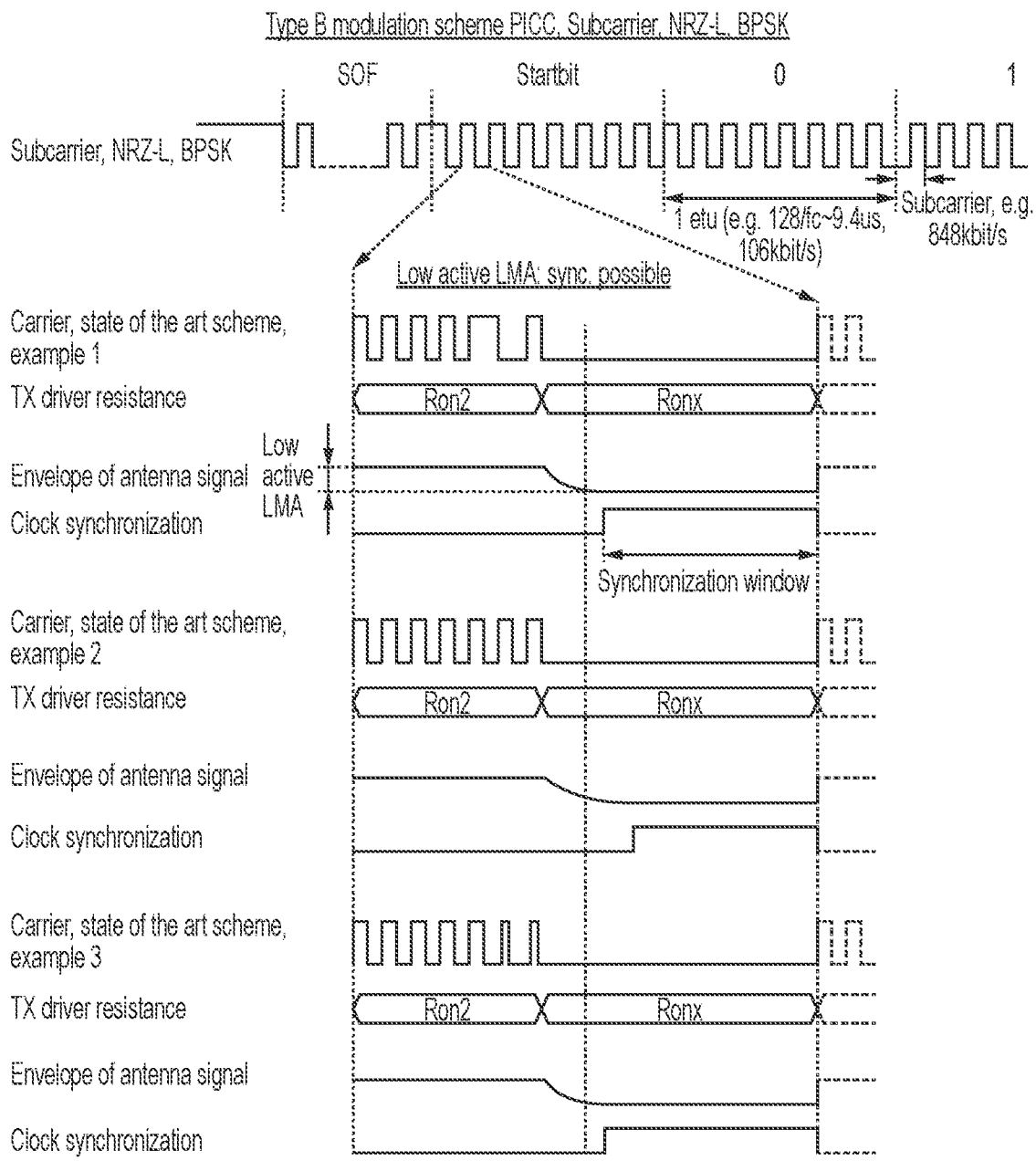
FIG. 3 shows examples of different modulation schemes.
Figure 3:
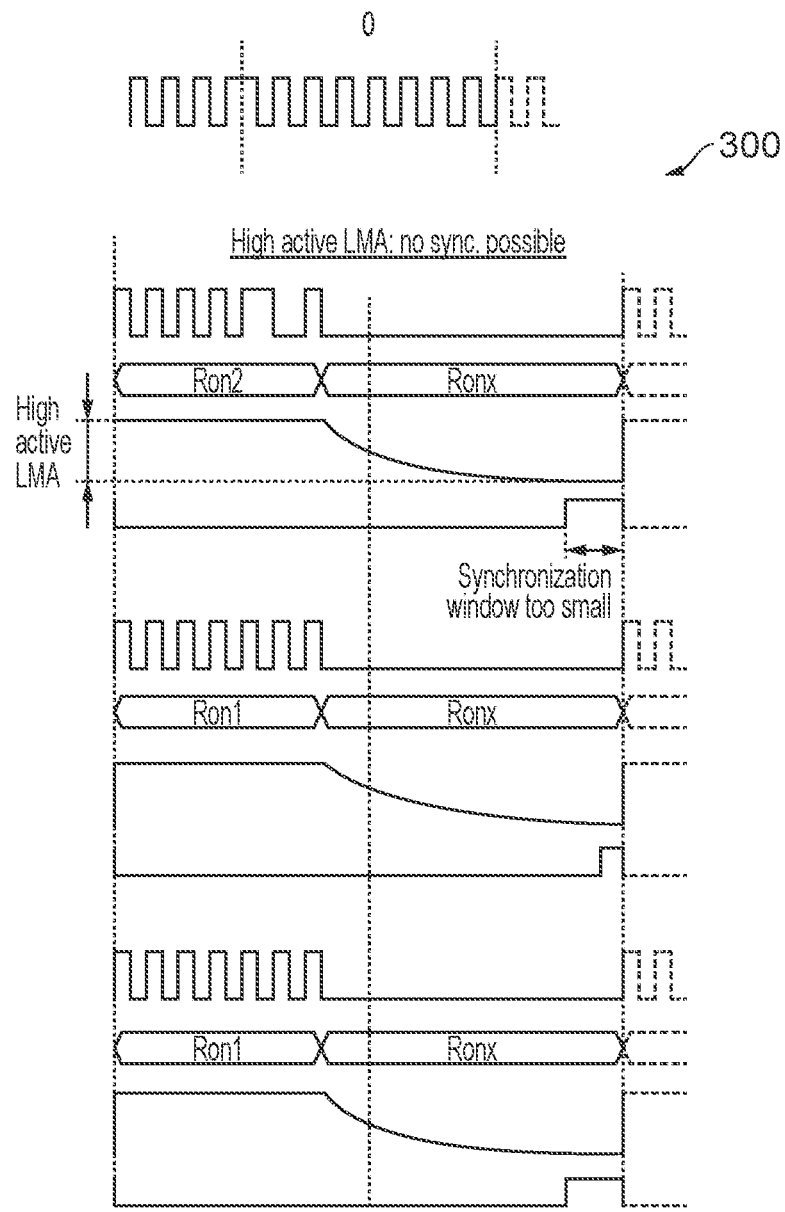

FIG. 3 shows examples of different modulation schemes 128. In the examples shown in FIG. 3, the clock can only be synchronized between carrier pauses. Depending on the quality factor of the antenna and/or matching network the synchronization window may only be wide enough for low active load modulation (ALM) strengths (left-hand side of FIG. 3). However, in case of high active load modulation strengths the synchronization window may become too small for a proper clock synchronization (right-hand side of FIG. 3). It is noted that clock synchronization refers to the process of bringing or keeping the internally generated clock in a synchronized state with the clock used by the reader.

In particular, three examples are shown of implementations that extend the synchronization window. Unfortunately, however, at high active ALM strengths the system is limited, and a proper clock synchronization is not possible. In the first implementation, the synchronization window is extended by removing one carrier and inverting the shape to improve the dumping of the signal at the antenna. In the second implementation, the synchronization window is extended by removing one carrier (or more) to improve the dumping of the signal at the antenna. In the third implementation, the synchronization window is extended by changing the duty cycle to improve the dumping of the signal at the antenna.

FIG. 4A shows an illustrative embodiment of an NFC device 400. The NFC device 400 comprises a modulator 402, a transmission driver 404 and a controller 406. The modulator 402 is configured to modulate an unmodulated carrier signal received from an external reader (not shown), which results in a modulated carrier signal. The controller 406 is configured to control a transmission of the modulated carrier signal to the external reader. Furthermore, the transmitter driver 404 is configured to drive said transmission (i.e., to transmit the modulated carrier signal to the external reader). The transmitter driver 404 has a variable resistance. For instance, the transmission driver may have a variable on-state resistance $R_{ON}$. In accordance with the present disclosure, the controller 406 is configured to change the variable resistance during a modulation phase of the NFC device 400. In this way, the damping of the transmitted signal can be improved, such that the synchronization window is widened also at high active ALM strengths. Thus, a proper clock synchronization is also possible at high active ALM strengths. It is noted that, although the modulator 402, transmission driver and controller 406 are shown as separate components, the skilled person will appreciate that one or more these components may be integrated into a single component. Furthermore, one or more these components may be embedded in another component. For example, the transmission driver 404 may be embedded in the controller 406. Furthermore, the NFC device 400 comprises a receiver 408 which is configured to receive the carrier signal from the external reader. The receiver 408 includes a clock recovery unit configured to recover a clock.

FIG. 4B shows an illustrative embodiment of a method 410 of operating an NFC device. The method 410 includes the following steps. At 412, the modulator modulates a carrier signal received from an external reader, which results in a modulated carrier signal. At 414, the controller controls a transmission of the modulated carrier signal to the external reader. Furthermore, at 416, the transmission driver transmits said modulated carrier signal, the transmission driver having a variable resistance. Furthermore, at 418, the controller changes the variable resistance during a modulation phase of the NFC device. The steps of method 410 may be carried out simultaneously. By changing the variable resistance during the modulation phase, the damping of the transmitted signal can be improved, such that the synchronization window is widened also at high active ALM strengths. Consequently, a proper clock synchronization is also possible at high active ALM strengths.

Figure 4C:
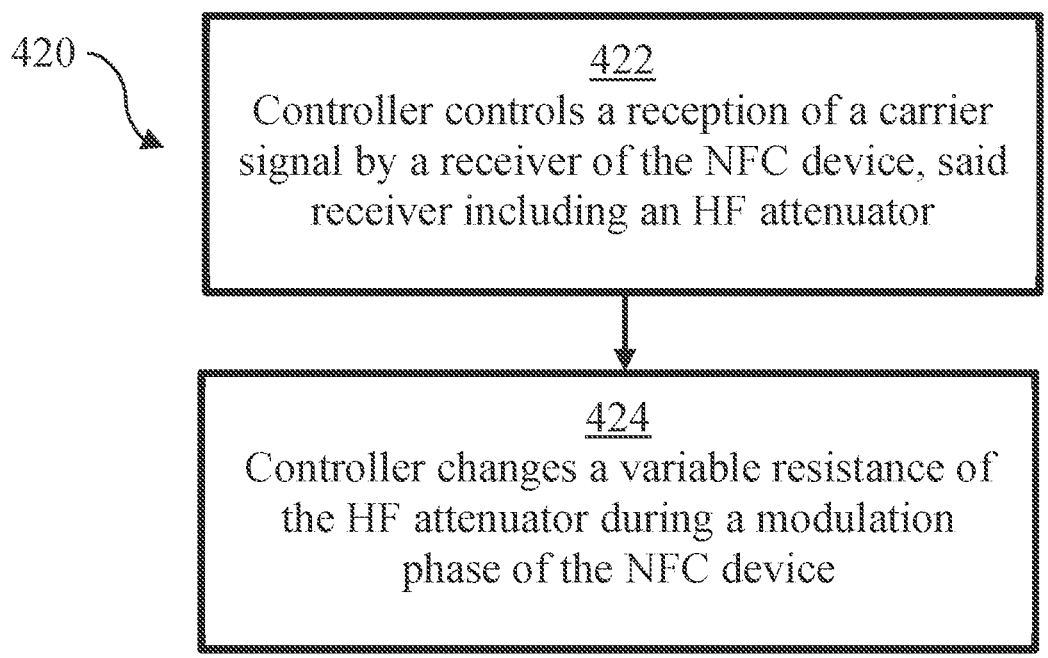
FIG. 4C shows another illustrative embodiment of a method of operating an NFC device.

FIG. 4C shows another illustrative embodiment of a method 420 of operating an NFC device. The method 420 comprises the following steps. At 422, the controller controls a reception of a carrier signal by the receiver of the NFC device, wherein said receiver includes an HF attenuator. Furthermore, at 424, the controller changes a variable resistance of the HF attenuator during the modulation phase of the NFC device. The steps of method 420 may be carried out simultaneously. Furthermore, the steps of method 420 may be carried out simultaneously with the steps of method 410. Accordingly, in one or more embodiments, the controller is further configured to control a reception of the carrier signal and to change, during the modulation phase of the NFC device, a variable resistance of an HF attenuator comprised in the receiver. In this way, the signal at the clock recovery can be optimized during the period of damping the transmitted signal.

Figure 5A:
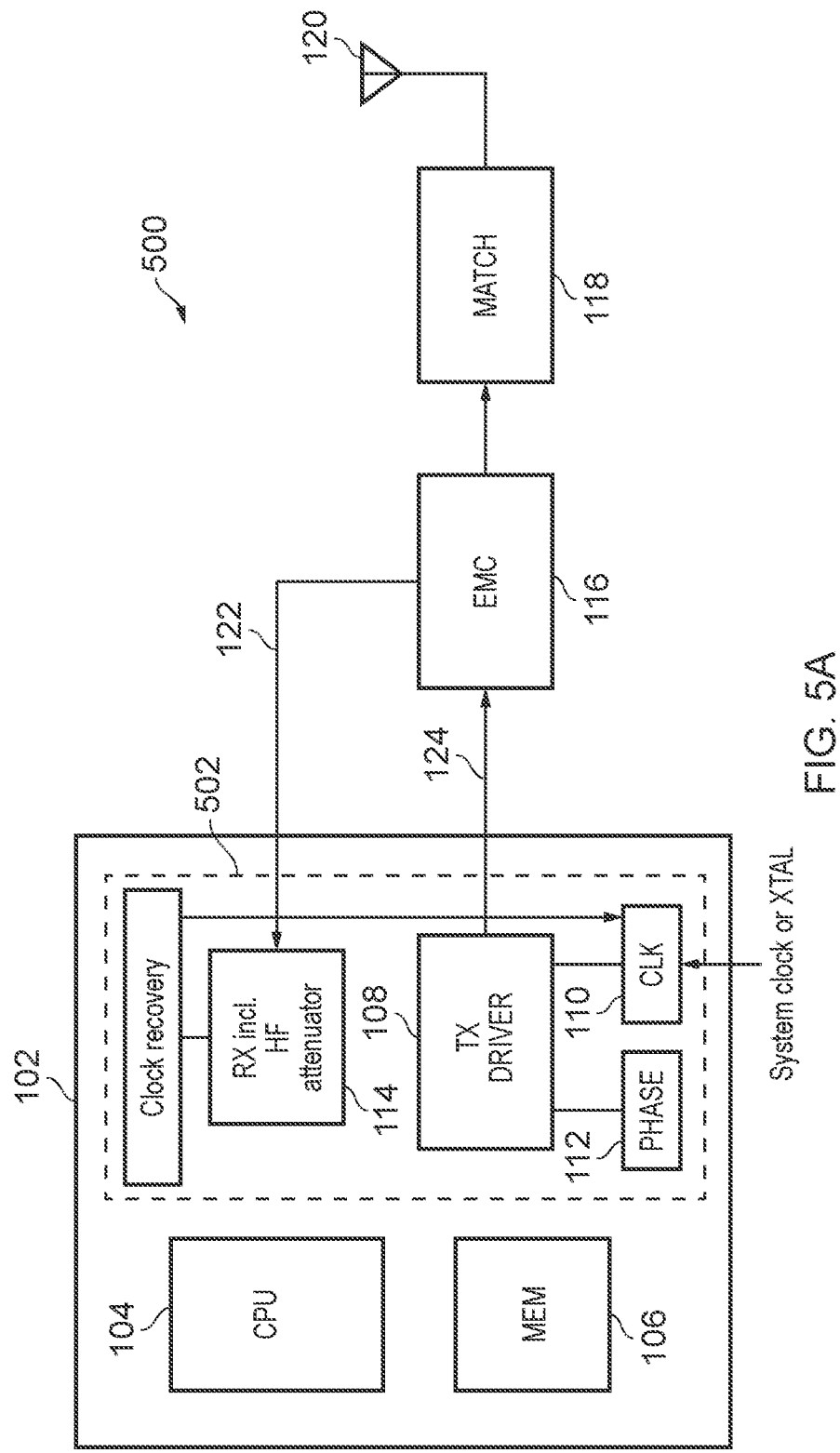
FIG. 5A shows another illustrative embodiment of an NFC device.

FIG. 5A shows another illustrative embodiment of an NFC device 500. In the NFC device shown in FIG. 5, the clock can be generated by an externally provided system clock or a crystal oscillator (XTAL). The clock can also be generated by internal clock recovery circuitry, which extracts the clock signal from a reader field over the antenna 120. In certain modulation schemes, such as binary phase shift keying (BPSK) modulation schemes, the system transmits a subcarrier (i.e., without pauses). Examples of BPSK modulation schemes are schemes defined by the standard ISO/IEC 14443 Type B or by the de facto standard FeliCa. In contrast, according to modulation schemes defined by the standard ISO/IEC 14443 Type A the system transmits a subcarrier with pauses.

Figure 5B:
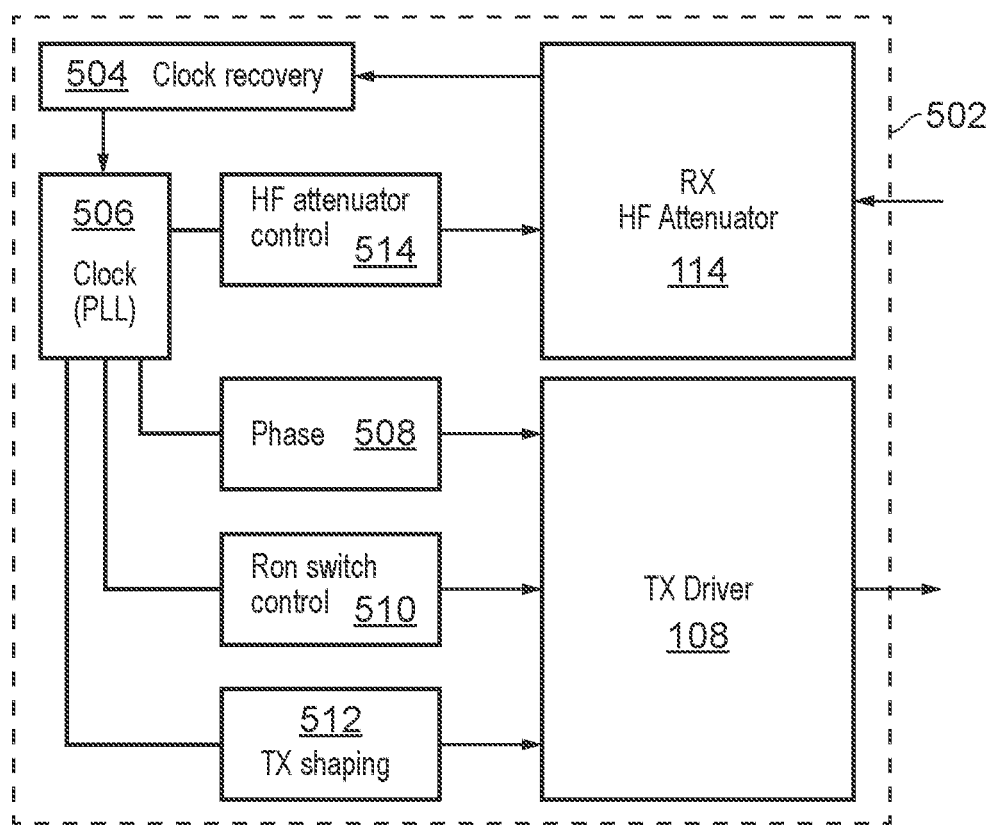
FIG. 5B shows an illustrative embodiment of an RF transceiver.

FIG. 5B shows an illustrative embodiment of an RF transceiver 502. The RF transceiver 502 comprises a clock recovery unit 504, a clock 506 (i.e., a phase-locked loop), a phase initialization unit 508, a transmitter driver resistance ($R_{ON}$) switch control unit 510, a transmission shaping unit 512, and an HF attenuator control unit 514. Using a phase-locked loop (PLL), the clock is provided to the phase initialization unit 508, $R_{ON}$ switch control unit 510, transmission shaping unit 512, and HF attenuator control unit 514. In accordance with the present disclosure, the $R_{ON}$ switch control unit 510 controls the variable resistance of the transmitter driver 108, in particular by switching between different resistance values $R_{ON}1, R_{ON}1, \ldots, R_{ON}x$ during a modulation phase of the NFC device. Furthermore, in accordance with an embodiment, the HF attenuator control unit 514 controls the variable resistance of the HF attenuator comprised in the receiver 114, in particular by switching between different resistance values $R_{HF}1, R_{HF}2, \ldots, R_{HF}x$ during a modulation phase of the NFC device. Furthermore, the phase initialization unit 508 may set the initial transmitter phase, and the transmission shaping unit 512 may apply a dedicated number of active clocks, a predefined duty cycle, and a predefined amplitude and phase inversion.

Figure 6:
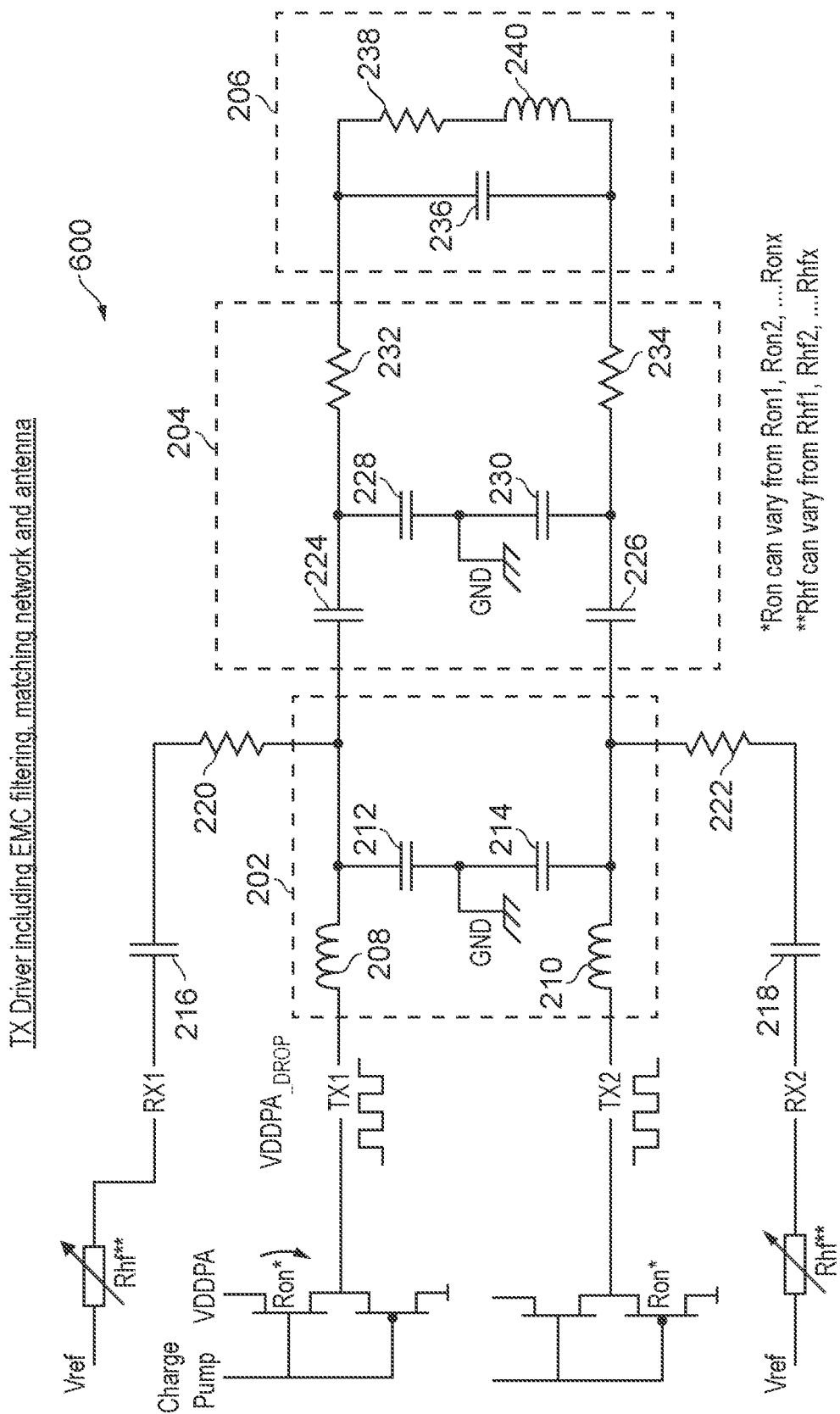
FIG. 6 shows an illustrative embodiment of a transceiver simulation model.

FIG. 6 shows an illustrative embodiment of a transceiver simulation model 600. The transmission driver of the transceiver has a variable on-state resistance $R_{ON}$. The resistance of the transmitter driver 600 during a modulation phase of the NFC device is different from the resistance of the transmitter driver 600 during a non-modulation phase. The resistance of the transmitter driver 600 can for example be selected from a plurality of different values $R_{ON}1, R_{ON}2, \ldots, R_{ON}x$, which are typically between 0.5 and 50 ohms. In accordance with the present disclosure, the resistance of the transmitter driver 600 is also varied or switched during the modulation phase of the NFC device. Furthermore, in accordance with an embodiment, the resistance of the HF attenuator is varied or switched during the modulation phase of the NFC device. In particular, the resistance of the HF attenuator can be selected from a plurality of different values $R_{HF}1, R_{HF}2, \ldots, R_{HF}x$.

In one or more embodiments, the controller is configured to change the variable resistance by selecting a resistance from a plurality of different resistances. In this way, changing the variable resistance is facilitated. Such a selection may for example be implemented as follows. Several resistances may be realized in silicon and provided in parallel. Then, a subset of these resistances may be activated, to define a final $R_{ON}$ value. In that case, the plurality of resistances corresponds to the different possible final $R_{ON}$ values, and the selection corresponds to activating a specific subset of the parallel resistances to arrive at a specific one of said possible final $R_{ON}$ values. The skilled person will appreciate that other implementations are possible too. Furthermore, in one or more embodiments, the controller is configured to select different resistances for consecutive transmission pulses during the modulation phase. This further improves the damping of the transmitted signal, which in turn further facilitates widening the synchronization window also at high active ALM strengths. For instance, a different resistance may be selected for each transmission pulse.

In one or more embodiments, the controller is further configured to remove one or more transmission pulses at a beginning of one or more modulation phases of the NFC device. This further facilitates widening the synchronization window, such that a proper clock synchronization is also possible at high active ALM strengths. The removal of one or more transmission pulses may be implemented in the digital part of the NFC controller.

Figure 7A:
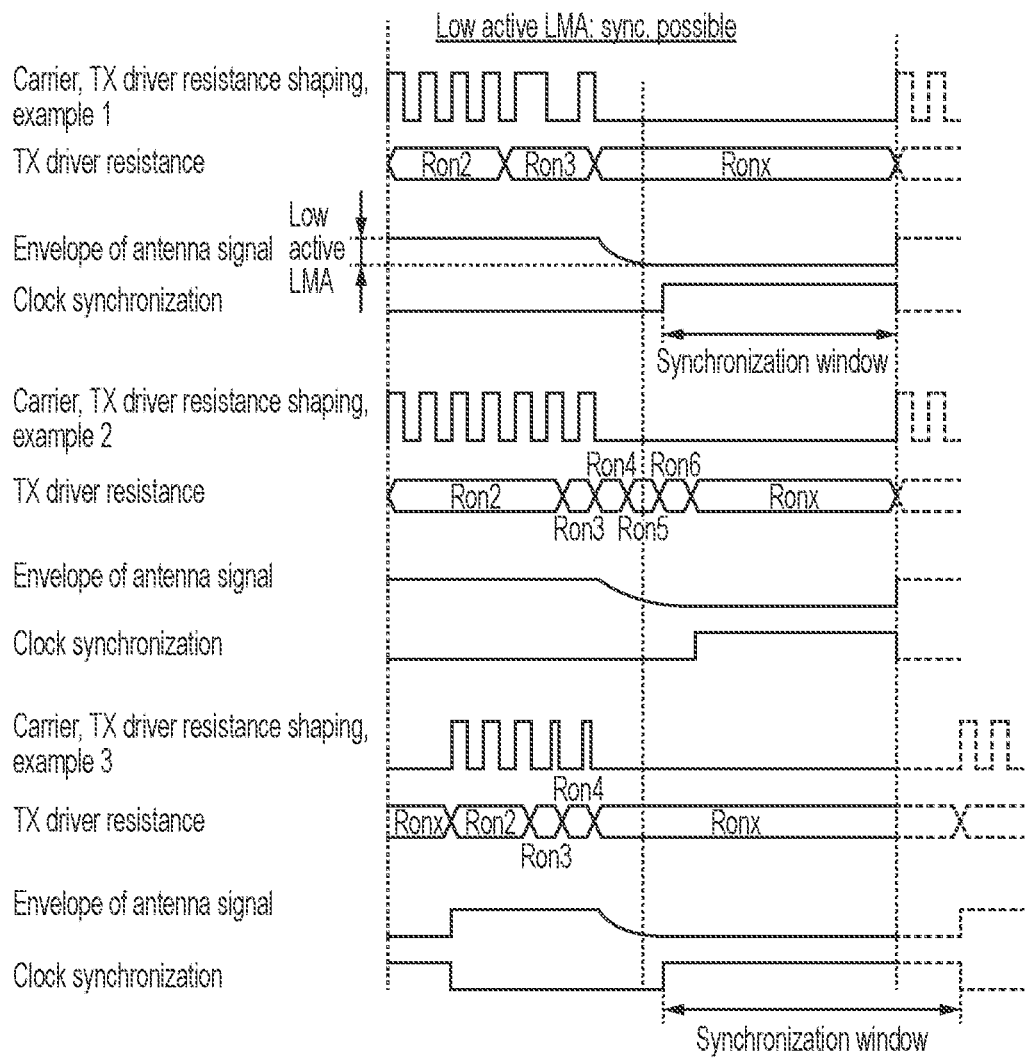
FIG. 7A shows illustrative embodiments of different modulation schemes.
Figure 7A:
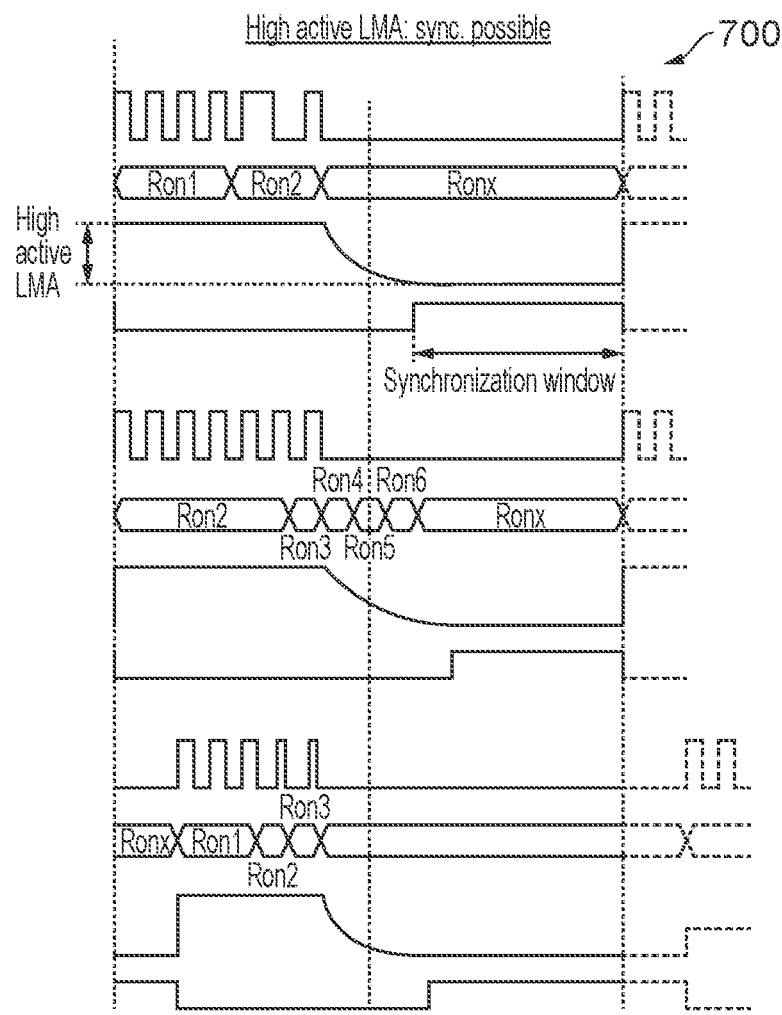

FIG. 7A shows illustrative embodiments of different modulation schemes 700. In particular, three embodiments are shown in which the synchronization window is extended by varying the driver resistance during the modulation phase. For instance, in the first embodiment (example 1), the driver resistance is changed from value $R_{ON}2$ to $R_{ON}3$ during the modulation phase. As a result, the antenna signal is dampened quickly when the non-modulation phase of the NFC device has started. This, in turn, widens the synchronization window also in case of high active load modulation strengths (right-hand side of FIG. 7A). Similarly, in the second embodiment (example 2), the driver resistance is changed from value $R_{ON}2$ to $R_{ON}3$, from value $R_{ON}3$ to $R_{ON}4$, from value $R_{ON}4$ to $R_{ON}5$ during the modulation phase, and from value $R_{ON}5$ to $R_{ON}6$ during the non-modulation phase. Thus, the value of $R_{ON}$ can also be changed during the non-modulation phase. Again, the antenna signal is dampened quickly when the non-modulation phase of the NFC device has started, which widens the synchronization window. In the third embodiment (example 3), the driver resistance is changed from value $R_{ON}2$ to $R_{ON}3$ and from value $R_{ON}3$ to $R_{ON}4$ during the modulation phase. Again, the antenna signal is dampened quickly when the non-modulation phase of the NFC device has started, which widens the synchronization window. In addition, some transmission pulses are omitted at the beginning of the modulation phases of the NFC device. Thereby, the synchronization window is further widened.

Figure 7B:
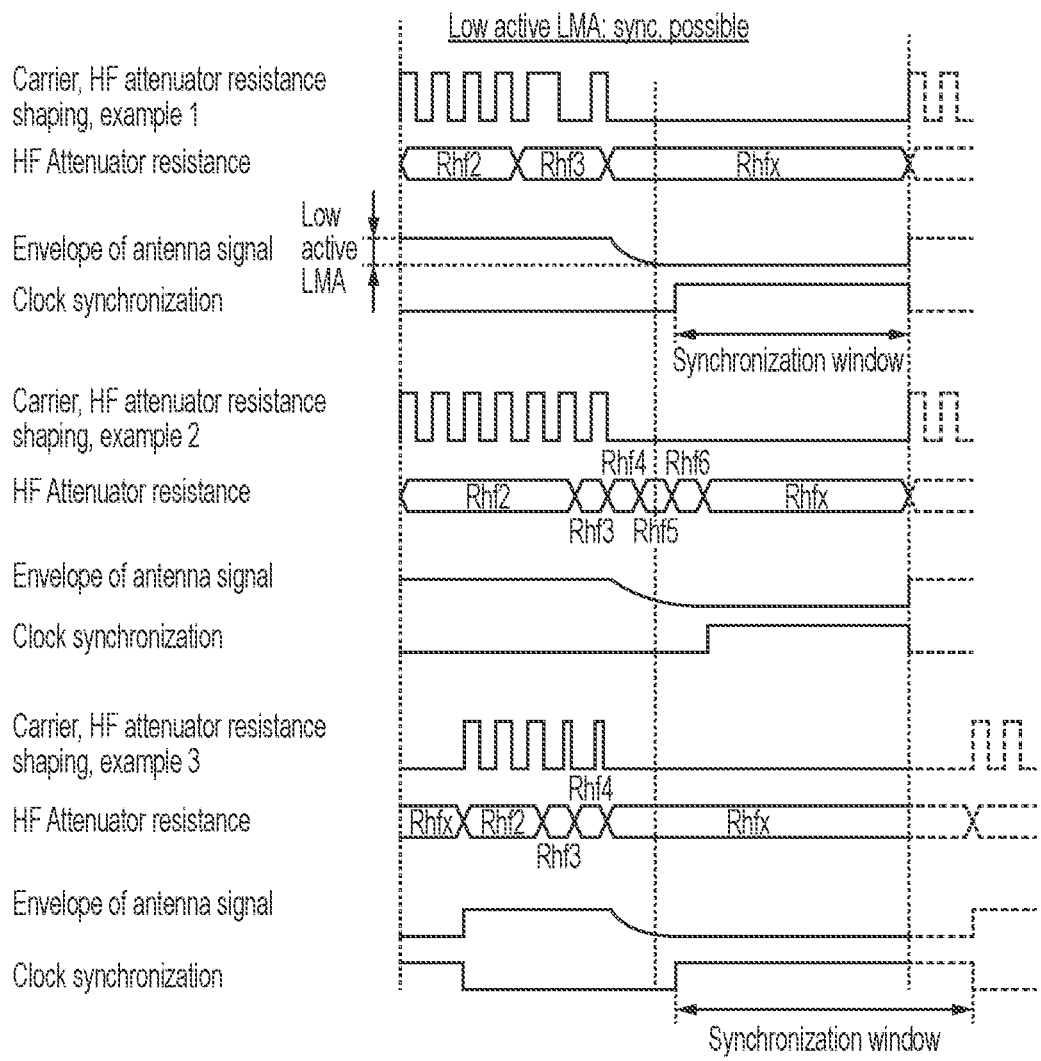
FIG. 7B shows further illustrative embodiments of different modulation schemes.
Figure 7B:
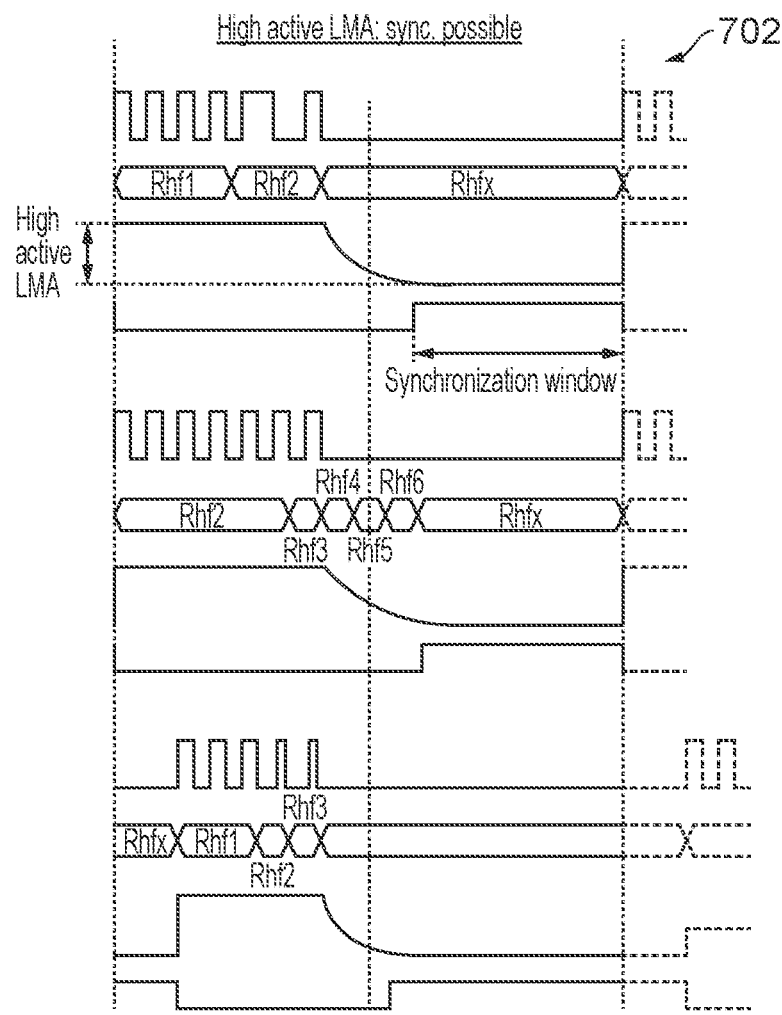

FIG. 7B shows further illustrative embodiments of different modulation schemes 702. In these embodiments, the resistance of the HF attenuator is varied or switched during the modulation phase of the NFC device. For instance, in the first embodiment (example 1), the HF attenuator resistance is changed from value $R_{HF}2$ to $R_{HF}3$ during the modulation phase. Similarly, in the second embodiment (example 2), the HF attenuator resistance is changed from value $R_{HF}2$ to $R_{HF}3$, from value $R_{HF}3$ to $R_{HF}4$, from value $R_{HF}4$ to $R_{HF}5$ during the modulation phase, and from value $R_{HF}5$ to $R_{HF}6$ during the non-modulation phase. Thus, the value of $R_{HF}$ can also be changed during the non-modulation phase. In the third embodiment (example 3), the HF attenuator resistance is changed from value $R_{HF}2$ to $R_{HF}3$ and from value $R_{HF}3$ to $R_{HF}4$ during the modulation phase. These embodiments may result in a more accurate control of the damping of the transmitted signal.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC device
102 NFC controller
104 central processing unit (CPU)
106 memory
108 transmitter driver circuit
110 clock generation circuit
112 phase adjustment circuit
114 receiver circuit including HF attenuator
116 electromagnetic compatibility (EMC) network
118 matching network 120 antenna
122 receive signal line
124 output signal line
126 radio-frequency (RF) transceiver
200 transceiver simulation model
202 EMC network model
204 matching network model
206 antenna model
208 inductor
210 inductor
212 capacitor
214 capacitor
216 capacitor
218 capacitor
220 resistor
222 resistor
224 capacitor
226 capacitor
228 capacitor
230 capacitor
232 resistor
234 resistor
236 capacitor
238 resistor
240 inductor
300 modulation schemes
400 NFC device
402 modulator
404 transmission driver
406 controller
408 receiver including clock recovery
410 method of operating an NFC device
412 modulator modulates a carrier signal received from an external reader, resulting in a modulated carrier signal
414 controller controls a transmission of the modulated carrier signal to the external reader
416 transmission driver transmits said modulated carrier signal, said transmission driver having a variable resistance
418 controller changes said variable resistance during a modulation phase of the NFC device
420 method of operating an NFC device
422 controller controls a reception of a carrier signal by a receiver of the NFC device, said receiver including an HF attenuator
424 controller changes a variable resistance of the HF attenuator during a modulation phase of the NFC device
500 NFC device
502 RF transceiver
504 clock recovery
506 clock (phase-locked loop)
508 phase
510 $R_{ON}$ switch control
512 TX shaping
514 HF attenuator control
600 transceiver simulation model
700 modulation schemes
702 modulation schemes

The invention claimed is:

1. A near field communication, NFC, device, comprising:
a modulator configured to modulate a carrier signal received from an external reader, resulting in a modulated carrier signal;
a controller configured to control a transmission of the modulated carrier signal to the external reader; and
a transmitter driver configured to transmit said modulated carrier signal, said transmitter driver having a variable resistance;
wherein the controller is further configured to change said variable resistance during a modulation phase of the NFC device such that a clock synchronization window is widened;
wherein the controller is configured to change said variable resistance by selecting a resistance from a plurality of different resistances; and
wherein the controller is configured to select different resistances for consecutive transmission pulses during the modulation phase.

2. The NFC device of claim 1, wherein the controller is further configured to select different resistances during the non-modulation phase.

3. The NFC device of claim 1, wherein the controller is further configured to remove one or more transmission pulses at a beginning of one or more modulation phases of the NFC device.

4. The NFC device of claim 1, further comprising a receiver for receiving the carrier signal, wherein the controller is further configured to control a reception of the carrier signal and to change, during the modulation phase of the NFC device, a variable resistance of an HF attenuator comprised in said receiver.

5. The NFC device of claim 4, wherein the controller is configured to change said variable resistance of the HF attenuator by selecting a resistance from a plurality of different resistances.

6. The NFC device of claim 5, wherein the controller is configured to select different resistances for consecutive transmission pulses during the modulation phase.

7. The NFC device of claim 6, wherein the controller is further configured to select different resistances during the non-modulation phase.

8. A mobile device comprising the NFC device of claim 1.

9. A method of operating a near field communication, NFC, device, the method comprising:
modulating, by a modulator, a carrier signal received from an external reader, resulting in a modulated carrier signal;
controlling, using a controller, a transmission of the modulated carrier signal to the external reader; and
transmitting, by a transmitter driver, said modulated carrier signal, said transmitter driver having a variable resistance;
wherein the controller changes said variable resistance during a modulation phase of the NFC device such that a clock synchronization window is widened;
wherein the controller changes said variable resistance by selecting a resistance from a plurality of different resistances; and
wherein the controller changes said variable resistance by selecting a resistance from a plurality of different resistances.

10. The method of claim 9, wherein the controller selects different resistances during the non-modulation phase.

11. The method of claim 9, wherein the controller removes one or more transmission pulses at a beginning of one or more modulation phases of the NFC device.

12. The method of claim 9, wherein the controller further controls a reception of the carrier signal by a receiver and changes, during the modulation phase of the NFC device, a variable resistance of an HF attenuator comprised in said receiver.

13. The method of claim 12, wherein the controller changes said variable resistance of the HF attenuator by selecting a resistance from a plurality of different resistances.

14. The method of claim 13, wherein the controller selects different resistances for consecutive transmission pulses during the modulation phase.

15. The method of claim 14, wherein the controller selects different resistances during the non-modulation phase.

16. The method of claim 9, wherein the method is implemented as instructions stored on a non-transitory machine-readable medium.

\* \* \* \* \*